(12) United States Patent
Warkentin et al.

(10) Patent No.: US 10,379,870 B2
(45) Date of Patent: Aug. 13, 2019

(54) SUPPORTING SOFT REBOOT IN MULTI-PROCESSOR SYSTEMS WITHOUT HARDWARE OR FIRMWARE CONTROL OF PROCESSOR STATE

(71) Applicant: VMware, Inc., Palo Alto, CA (US)

(72) Inventors: Andrei Warkentin, North Andover, MA (US); Cyprien Laplace, Boston, MA (US); Regis Duchesne, Monts-de-Corsier (CH); Alexander Fainkichen, Southborough, MA (US); Ye Li, Newton Highlands, MA (US)

(73) Assignee: VMware, Inc., Palo Alto, CA (US)

( * ) Notice: Subject to any disclaimer, the term of this patent is extended or adjusted under 35 U.S.C. 154(b) by 209 days.

(21) Appl. No.: 15/644,670

(22) Filed: Jul. 7, 2017

(65) Prior Publication Data

US 2019/0012179 A1    Jan. 10, 2019

(51) Int. Cl.
| | |
|---|---|
| *G06F 9/44* | (2018.01) |
| *G06F 9/4401* | (2018.01) |
| *G06F 3/06* | (2006.01) |
| *G06F 12/1009* | (2016.01) |
| *G06F 9/38* | (2018.01) |
| *G06F 12/121* | (2016.01) |
| *G06F 12/1027* | (2016.01) |

(52) U.S. Cl.
CPC ............ *G06F 9/4403* (2013.01); *G06F 3/065* (2013.01); *G06F 3/068* (2013.01); *G06F 3/0619* (2013.01); *G06F 9/38* (2013.01); *G06F 12/1009* (2013.01); *G06F 12/1027* (2013.01); *G06F 12/121* (2013.01); *G06F 2212/65* (2013.01); *G06F 2212/68* (2013.01)

(58) Field of Classification Search
CPC ........................... G06F 9/4403; G06F 12/1009
See application file for complete search history.

(56) References Cited

U.S. PATENT DOCUMENTS

| | | | | |
|---|---|---|---|---|
| 2014/0082253 | A1* | 3/2014 | Macpherson | ............. G06F 9/06 711/6 |
| 2016/0170679 | A1* | 6/2016 | Warkentin | ............ G06F 3/0632 711/203 |

* cited by examiner

*Primary Examiner* — Albert Wang
(74) *Attorney, Agent, or Firm* — Patterson + Sheridan, LLP

(57) ABSTRACT

A method of initializing a secondary processor pursuant to a soft reboot of system software comprises storing code to be executed by the secondary processor in memory, building first page tables to map the code into a first address space and second page tables to identically map the code into a second address space, fetching a first instruction of the code based on a first virtual address in the first address space and the first page tables, and executing the code beginning with the first instruction to switch from the first to the second page tables. The method further comprises, fetching a next instruction of the code using a second virtual address, which is identically mapped to a corresponding machine address, turning off a memory management unit of the secondary processor, and executing a waiting loop until a predetermined location in the physical memory changes in value.

20 Claims, 5 Drawing Sheets

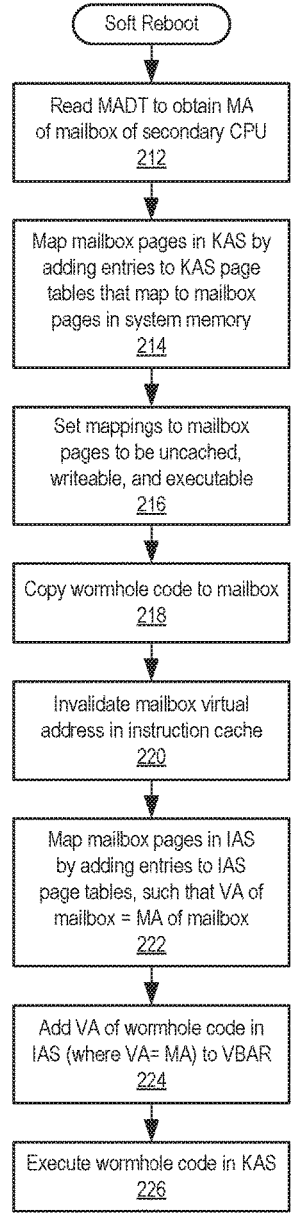
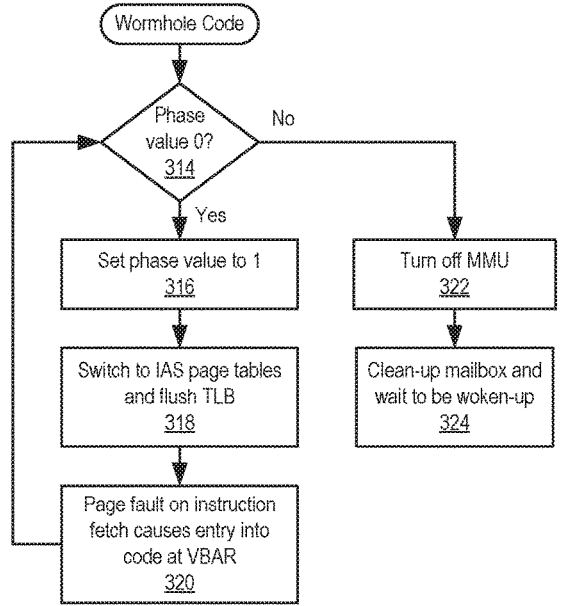
FIG. 3
FIG. 2

SUPPORTING SOFT REBOOT IN MULTI-PROCESSOR SYSTEMS WITHOUT HARDWARE OR FIRMWARE CONTROL OF PROCESSOR STATE

BACKGROUND

Typical multi-processor systems, such as x86-based systems, use hardware or firmware-coordinated protocol for re-initializing secondary CPUs to a known state before they are brought up inside system software (e.g., operating system or hypervisor). On x86-based systems, this means sending some special commands to an interrupt controller. On the next generation of ARM®64 systems, CPU state coordination will be done via special firmware calls (i.e., CPU on, CPU off).

However, in some current generation platforms, e.g., ARM®64 platforms, secondary CPU initialization is carried out with a "mailbox" approach, not via resident firmware calls. This approach, which may be implemented, for example, using Microsoft MP Startup for ARM platforms, relies on the boot firmware reserving some frames of physical memory (also referred to as "pages" herein) and "parking" the secondary CPUs in a code loop that checks a special location in this frame, also known as the "jump address slot." The per-CPU reserved frames of memory are then reported to the system software via a firmware configuration mechanism, for example, via MADT (Multiple APIC Description Table) in situations where system power management is carried out in accordance with the ACPI (Advanced Configuration and Power Interface) standard.

To start running system software code on a secondary processor, the system software writes a physical address of a secondary boot code into the "jump address slot" for the desired CPU. The "parked" CPU will then notice the jump address slot changing to a non-zero value and jump to that physical address, thus beginning the sequence of secondary processor boot-up.

SUMMARY

Embodiments provide support for soft rebooting in multi-processor systems without hardware or firmware control of processor state. According to embodiments, system software of a multi-processor system, upon receipt of a command to soft reboot the multi-processor system (i.e., to boot the system into another instance of the system software), allocates frames of physical memory as mailboxes for the secondary CPUs, and the secondary CPUs "reparks" themselves in a code loop while checking the jump address slot of their respective mailboxes for a change to a non-zero value. When the system software, during the soft reboot, writes a physical address of the secondary boot code for each of the secondary CPUs into the jump address slot for that secondary CPU, each secondary CPU will notice its corresponding jump address slot changing to a non-zero value and jump to the physical address written into its jump address slot, to begin the process for its re-initialization. As used herein, a "primary" CPU is the processor that is designated to carry out the soft reboot process, e.g., the boot processor, and "secondary" CPUs are other non-primary CPUs of the multi-processor system.

A method of initializing a secondary processor pursuant to a soft reboot of system software, according to one embodiment, comprises storing code to be executed by the secondary processor in a region of physical memory, building first page tables to map the code into a first address space and second page tables to identically map the code into a second address space, fetching a first instruction of the code from a first location in the physical memory based on a first virtual address and active page tables, wherein the first virtual address is a virtual address in the first address space, and executing the code beginning with the first instruction to switch the active page tables from the first page tables to the second page tables. The method further comprises, after the active page tables have been switched from the first page tables to the second page tables, (i) fetching a next instruction of the code to be executed from a second location in the physical memory using a second virtual address, which is identically mapped to a corresponding machine address, (ii) turning off a memory management unit of the secondary processor, and (iii) executing a waiting loop until a predetermined location in the physical memory changes in value, and (iv) exiting the waiting loop and executing an initialization code at a physical memory address corresponding to the changed value.

Further embodiments include a non-transitory computer-readable storage medium storing instructions that, when executed by a computing device, cause the computing device to perform the method set forth above, and a computing device programmed to carry out the method set forth above.

BRIEF DESCRIPTION OF THE DRAWINGS

FIGS. 2 and 3 depict a method for re-parking a secondary CPU in a waiting state according to a first embodiment.

DETAILED DESCRIPTION

Figure 1:
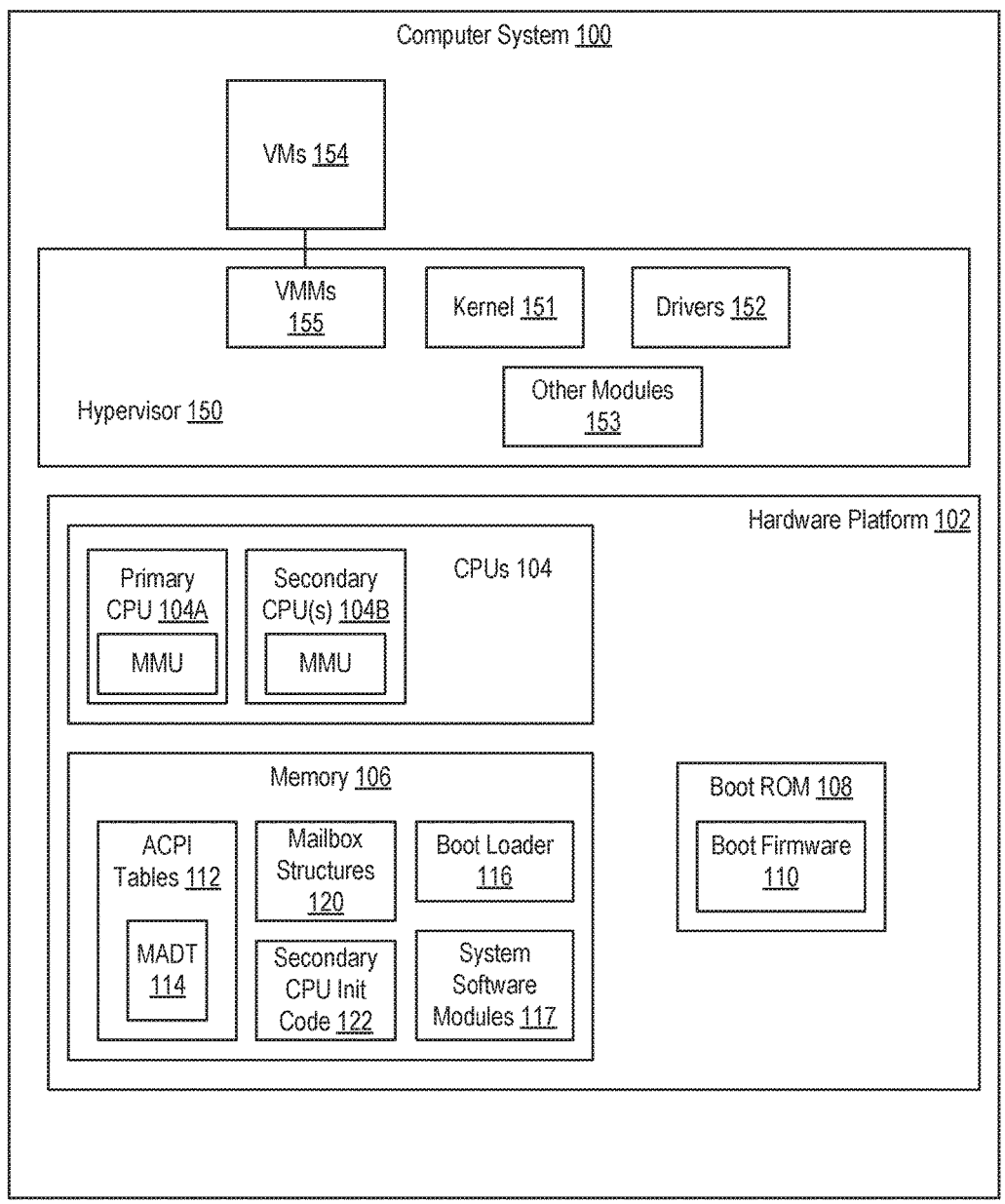
FIG. 1 is a block diagram of a computer system in which soft rebooting according to embodiments may be carried out.

FIG. 1 is a block diagram of a computer system 100 in which a soft reboot according to embodiments may be carried out. Computer system 100 includes system software executing on a hardware platform 102, which in the embodiment illustrated herein is a current generation ARM®64 platform. Also, in the embodiment illustrated in FIG. 1, system software is hypervisor 150. In other embodiments, system software may be an operating system, e.g., any of the commodity operating system known in the art, such as Linux®, Microsoft Windows®, or the like. Hardware platform 102 includes central processing units (CPUs) 104, system memory 106 (typically made up of one or more dynamic random access memory (DRAM) modules), and read-only-memory (ROM) 108 containing boot firmware 110. CPUs 104 include a primary CPU 104A having an associated memory management unit (MMU) and a translation look-aside buffer (TLB) and one or more secondary CPUs 104B each having an associated MMU and an associated TLB. CPUs 104 are configured to execute instructions, for example, executable instructions that perform one or more operations described herein and are stored in system memory 106.

Hypervisor 150 is virtualization software that supports running of multiple virtual machines (VMs) 154 on computer system 100. VMs 154 run on top of respective virtual machine monitors (VMMs) 155, which implement a virtual hardware platform for their respective VMs. Hypervisor 150 includes a kernel 151, drivers 152 and other modules 153 that manage, and provide an interface to, hardware resources of hardware platform 102.

Boot firmware 110 includes the initial instructions executed by primary CPU 104A during the boot process. In one embodiment, boot firmware 110 is compliant with the Unified Extensible Firmware Interface (UEFI) specification. After booting is initiated, e.g., upon system power-on, boot firmware 110 carries out the functions of initializing and testing the various hardware devices of computer system 100 for correct operation. This process is commonly known as power-on self-test (POST). Boot firmware 110 then locates and loads boot loader 116 into system memory 106 and hands off execution control to boot loader 116. Boot loader 116, upon taking control of the boot process, loads system software modules 117, which include kernel 151, drivers 152, and other modules 153, into system memory 106.

Thereafter, boot firmware 110 sets up mailbox structures 120 (also referred to herein as "mailboxes") for each of secondary CPUs 104B in system memory 106, loads secondary CPU initialization code 122 for each of secondary CPUs 104B into system memory 106, and parks secondary CPUs 104B in a code loop. While parked in the code loop, each secondary CPU 104B checks the jump address slot in its mailbox for a change to a non-zero value, and upon change to the non-zero value, e.g., a physical address of system memory 106 (also referred to as "machine address") at which secondary CPU initialization code 122 is stored, jumps to that physical address and begins executing a sequence of instructions starting from that physical address. In one embodiment, Microsoft MP Startup for ARM platforms is employed to implement the mailboxes, loading secondary CPU initialization code 122 for each of secondary CPUs 104B, and parking secondary CPUs 104B in a code loop.

During the boot process described above, boot firmware 110 and boot loader 116 generate ACPI tables 112, which are stored in system memory 106. ACPI tables 112 describe various aspects of hardware platform 102. One of ACPI tables 112 is MADT 114, which contain information about mailbox structures 120, in particular the locations (i.e., physical or machine addresses) of mailbox structures 120 in system memory 106.

Boot loader 116 eventually hands off execution control to kernel 151, and kernel 151 initiates the process of secondary CPU initialization by writing a physical address into the jump address slot of the mailbox structure for each of secondary CPUs 104B. The physical address that is written corresponds to the location in system memory 106 (i.e., physical address) of secondary CPU initialization code 122 for the secondary CPU that is being initialized. In one embodiment, the same secondary CPU initialization code is employed for all secondary CPUs 104B. In such situations, the same physical address is written into the jump address slot of each of mailbox structures 120. In response to the writing of the physical address in the jump address slot, each of secondary CPUs 104B will notice the jump address slot changing to a non-zero value and jump to the physical address written into that jump address slot to begin execution of secondary CPU initialization code 122.

Mailbox structures 120 are not preserved after completion of the boot process. Therefore, upon receipt of a command to soft reboot computer system 100 (i.e., to boot computer system 100 into another instance of the system software), mailbox structures 120 are reconstructed according to embodiments, and secondary CPUs 104B are de-initialized and "reparked" in preparation to be re-initialized, as described below.

In the description of soft rebooting below, an example of a single secondary CPU being re-initialized pursuant to a soft reboot of the computer system is provided. However, it should be recognized that the description is applicable to one or more other secondary CPUs in computer systems having multiple secondary CPUs.

FIGS. 2 and 3 depict a method for re-parking a secondary CPU in a waiting state according to a first embodiment. FIG. 2 depicts a method carried out by the system software executed on a secondary CPU and triggered upon receipt of a command to soft reboot the computer system via an inter-processor interrupt (IPI) from primary CPU 104A or upon detecting that a special flag in per-CPU data has been set to indicate that the secondary CPU should prepare for a soft reboot.

Figure 4:
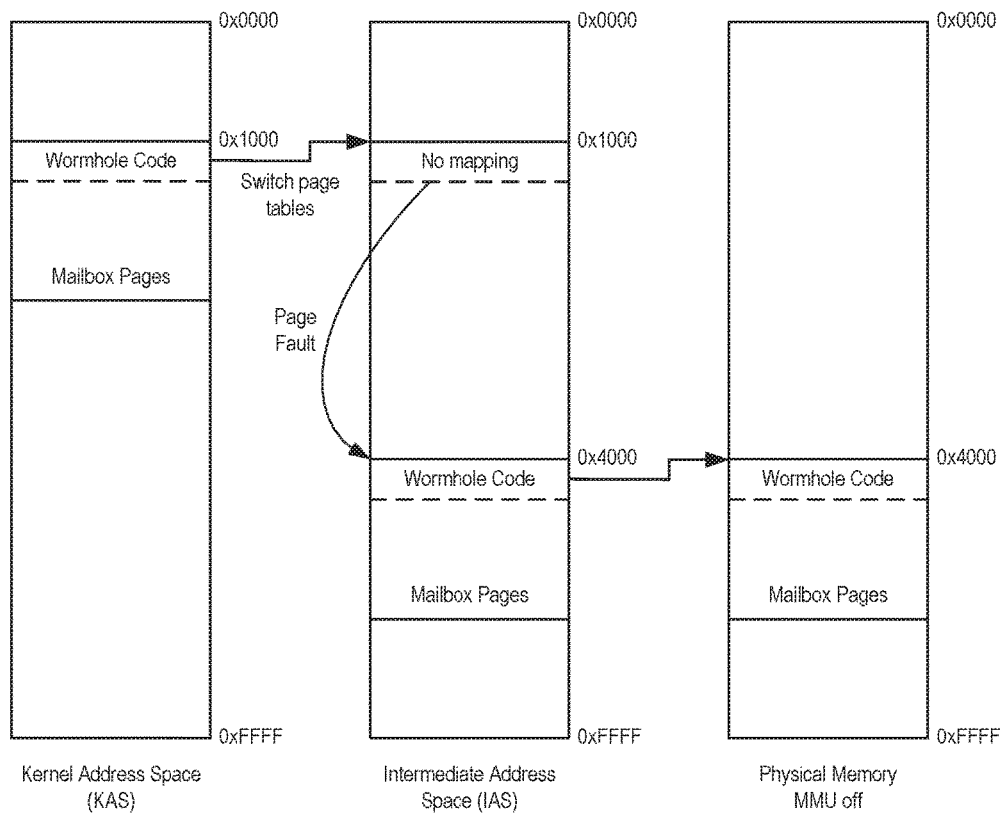
FIG. 4 depicts different address spaces to illustrate how the secondary CPU is reparked into the waiting state according to the first embodiment.

Upon receiving the command to soft reboot, the system software at step 212 reads MADT 114 to obtain the machine address of the mailbox of the current secondary CPU. This machine address represents the starting address of mailbox pages stored in system memory 106. Then, at step 214, the system software maps the mailbox pages in the kernel address space (KAS) by adding entries to KAS page tables to map the mailbox pages in KAS to mailbox pages in system memory 106. FIG. 4 illustrates an example where the mailbox pages in KAS begin at virtual address 0x1000 and corresponding physical pages in system memory 106 begin at machine address 0x4000.

At step 216, the system software modifies the KAS page tables to set the mappings to the mailbox pages to be uncached, writeable and executable. Then, the system software at step 218 copies a piece of code for de-initializing and reparking the secondary CPU, referred to herein as "wormhole code," into the first mailbox page, and at step 220 invalidates the virtual address corresponding to the start of the wormhole code in the system software's instruction cache.

At step 222, the system software maps the mailbox pages in an intermediate address space (IAS) by adding entries to IAS page tables, so that these mailbox pages will be identically mapped, i.e., the virtual address in the IAS is the same as the physical address in system memory 106. FIG. 4 illustrates the mailbox pages in IAS beginning at 104B address 0x4000, which is the machine address at which the mailbox pages are stored in system memory 106.

At step 224, the system software sets the vector base address register (VBAR) of the secondary CPU to the virtual address in IAS that corresponds to the identity-mapped start of the wormhole code, i.e., VA=MA. The virtual address is computed in a way such that a page fault will result in the fetching and execution of an instruction at the immediate start of the wormhole code.

At step 226, the system software begins execution of the wormhole code in KAS corresponding to the start of the wormhole code (e.g., instruction at 0x1000 in KAS). Two parameters are passed for executing the wormhole code. They are the machine address of the IAS page tables and an initial phase value of 0. This phase value is kept in a special register, e.g., in first register x0 in embodiments where hardware platform 102 is the ARM®64 platform.

FIG. 3 depicts the execution of the wormhole code by the secondary CPU. Upon entry into the wormhole code, the secondary CPU at step 314 checks the phase value in the special register. Because the initial phase value is set to 0 upon entry into the wormhole code, step 316 is executed next. At step 316, the secondary CPU sets the phase value in the special register to 1. Thus, when step 314 is executed at a later time, step 322 is executed instead of step 316.

At step 318, the secondary CPU switches the page table root to the IAS page tables (e.g., by storing the machine address of the IAS page tables in a page table base register), and flushes the TLB of the secondary CPU. As a result of flushing the TLB, the MMU of the secondary CPU walks the page tables (which is now the IAS page tables, not the KAS page tables, as a result of the switch) to fetch the next instruction for the wormhole code. However, as illustrated in FIG. 4, the switch to the IAS page tables triggers a page fault because the wormhole code is not mapped in same virtual address locations in the IAS as in the KAS. The resulting page fault is handled by executing the instruction at the virtual address stored in VBAR. This virtual address is shown in FIG. 4 as the identically mapped starting machine address of the wormhole code. Therefore, as a result of the page fault, the wormhole code resumes execution from the beginning. In other words, the flow in FIG. 3 returns to step 314.

At step 314, the secondary CPU checks the phase value in the special register. Because this phase value was set to 1 at step 316, step 322 is executed next. At step 322, the secondary CPU turns off its MMU, e.g., by modifying bit 0 of SCTLR in ARM®64 platform implementations. Then, at step 324, the secondary CPU cleans up the mailbox, e.g., by overwriting the pages at the beginning of the mailbox to values as per the mailbox specification, for example, Microsoft MP Startup for ARM platforms. At step 324, the secondary CPU also zeroes out the jump address slot, e.g., at offset 8, and enters a loop where it waits for an event, in particular an ARM SEV (send event instruction) in ARM®64 platform implementations. In the embodiments illustrated herein, this event is issued by primary CPU 104A during the soft reboot after it writes the physical address of secondary CPU initialization code 122 in the respective jump address slots of secondary CPUs 104B. Upon detecting the event, the secondary CPU checks the jump address slot and if non-zero, jumps to the physical address having that non-zero value to begin execution of secondary CPU initialization code 122.

In an alternative embodiment, a wait-for-interrupt (WFI) may be employed instead of wait-for-event (WFE). However, WFE implementation is preferred because, with the WFE implementation, (1) the interrupt controller need not be reset to a known good state, which might be challenging to do because the system might be a crashed state and (2) different possible versions of the interrupt controller do not need to be supported.

Figures 5, 6:
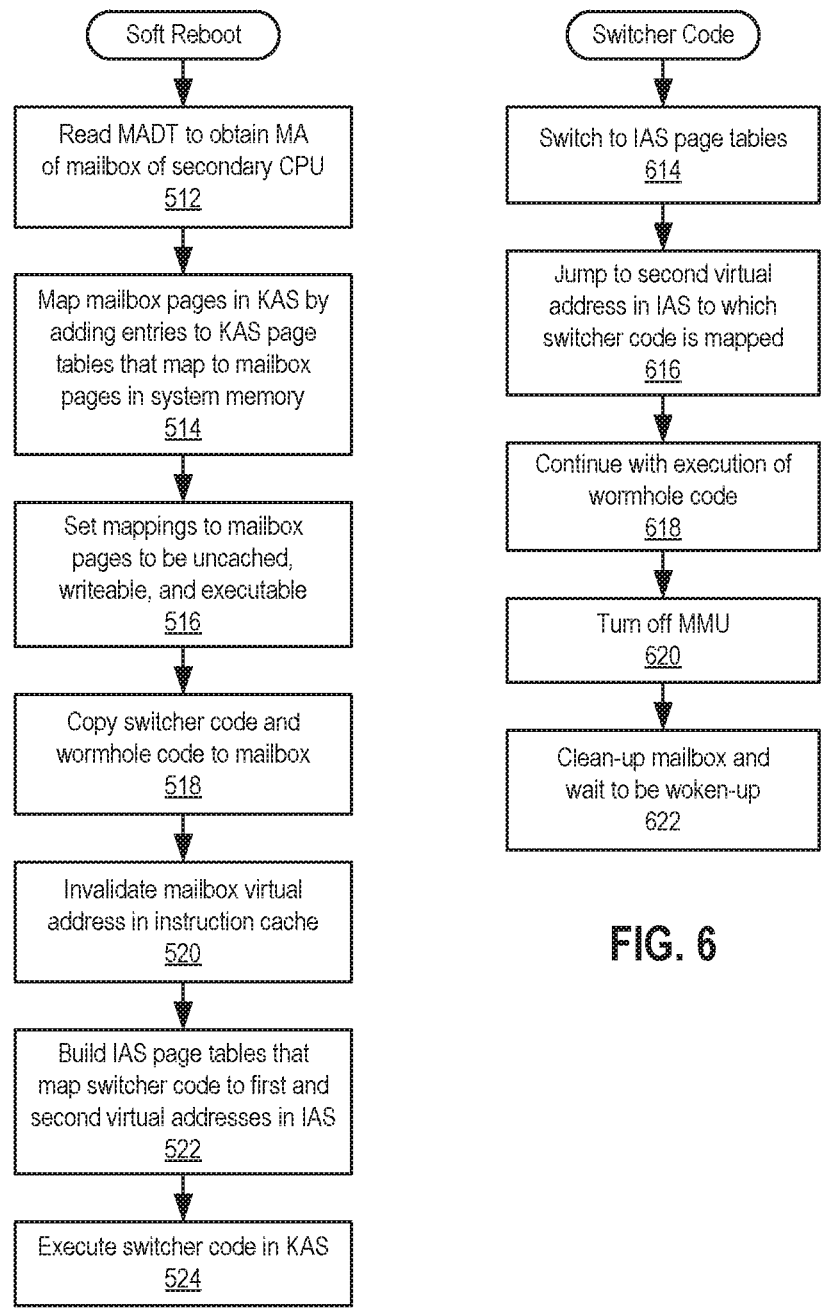
FIGS. 5 and 6 depict a method for re-parking a secondary CPU in a waiting state according to a second embodiment.

FIGS. 5 and 6 depict a method for re-parking a secondary CPU in a waiting state according to a second embodiment. FIG. 5 depicts a method carried out by the system software executed on a secondary CPU and triggered upon receipt of a command to soft reboot the computer system via an inter-processor interrupt (IPI) from primary CPU 104A or upon detecting that a special flag in per-CPU data has been set to indicate that the secondary CPU should prepare for a soft reboot.

Upon receiving the command to soft reboot, the system software at step 512 reads MADT 114 to obtain the machine address of the mailbox of the secondary CPU. This machine address represents the starting address of mailbox pages stored in system memory 106. Then, at step 514, the system software maps the mailbox pages in the kernel address space (KAS) by adding entries to KAS page tables to map the mailbox pages in KAS to mailbox pages in system memory 106. FIG. 5 illustrates an example where the mailbox pages in KAS begin at virtual address 0x1000 and corresponding physical pages in system memory 106 begin at machine address 0x4000.

At step 516, the system software modifies the KAS page tables to set the mappings to the mailbox pages to be uncached, writeable and executable. Then, the system software at step 518 copies a switcher code into the first mailbox page and the wormhole code into the second and subsequent mailbox pages, and at step 520 invalidates the virtual address corresponding to the start of the switcher code in the system software's instruction cache.

Figure 7:
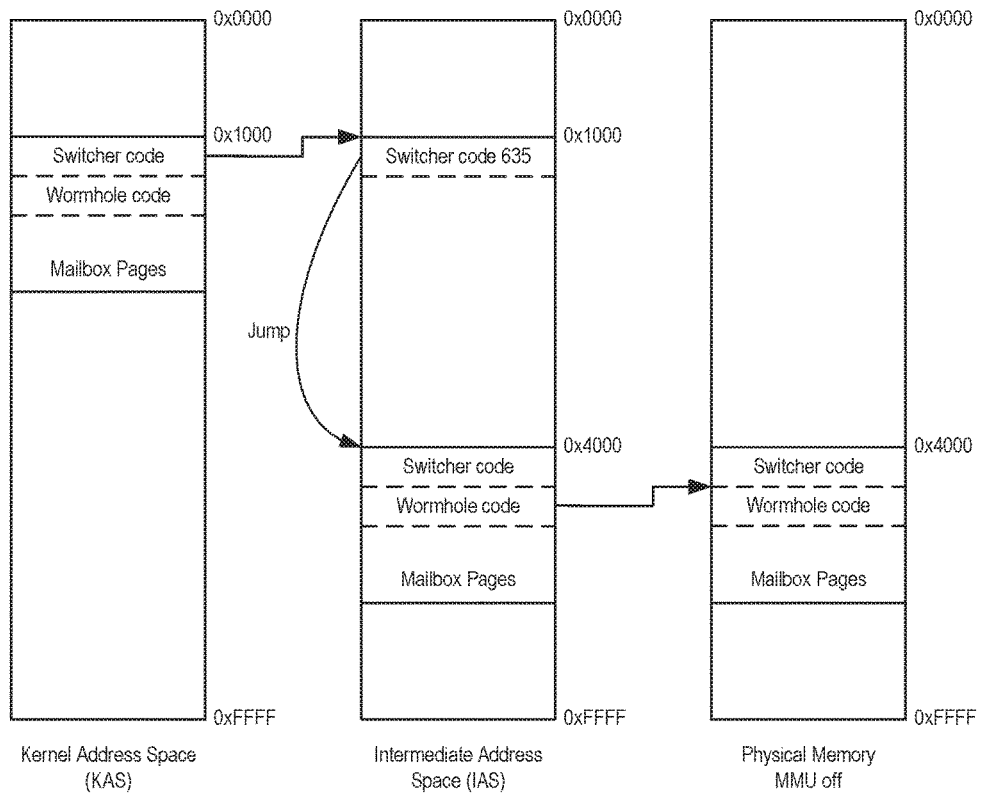
FIG. 7 depicts different address spaces to illustrate how the secondary CPU is reparked into the waiting state according to the second embodiment.

At step 522, the system software builds IAS page tables to map the switcher code to two different virtual addresses in the IAS: at an address matching the KAS mapping and at an identically mapped address, with VA equal to MA. FIG. 7 illustrates the switcher code mapped to IAS virtual addresses 0x1000 (the same as the virtual address in the KAS) and 0x4000 (the same as the physical address in the machine address space), and the mailbox pages in IAS beginning at virtual address 0x4000, which is the machine address at which the mailbox pages are stored in system memory 106.

At step 524, the system software initiates execution of the switcher code in the KAS (e.g., instruction at 0x1000 in KAS). One parameter is passed for executing the switcher code. This parameter is the machine address of the IAS page tables.

FIG. 6 depicts the execution of the switcher code by the secondary CPU followed by the execution of the wormhole code. Upon entry into the switcher code, the secondary CPU at step 614, the secondary CPU switches the page table root to the IAS page tables (e.g., by storing the machine address of the IAS page tables in a page table base register), and invalidates the TLB. At step 616, the secondary CPU fetches the next instruction of the switcher code, following the TLB invalidate, which branches to VA+offset, where VA is the next address after the one just executed and offset is the difference between the two virtual addresses in the IAS to which the switcher code is mapped. By performing this jump at step 616, as illustrated in FIG. 7, the secondary CPU is now fetching instructions of the switcher code from virtual addresses in the IAS that are identically mapped.

At step 618, the secondary CPU continues the execution by fetching instructions of the wormhole code that follows the switcher code. At step 620, the secondary CPU turns off its MMU, e.g., by modifying bit 0 of SCTLR in ARM®64 platform implementations. Then, at step 622, the secondary CPU cleans up the mailbox, e.g., by overwriting the pages at the beginning of the mailbox to values as per the mailbox specification, for example, Microsoft MP Startup for ARM platforms. At step 622, the secondary CPU also zeroes out the jump address slot, e.g., at offset 8, and enters a loop where it waits for an event, in particular an ARM SEV (send event instruction) in ARM®64 platform implementations. In the embodiments illustrated herein, this event is issued by primary CPU 104A during the soft reboot after it writes the physical address of secondary CPU initialization code 122 in the respective jump address slots of secondary CPUs 104B. Upon detecting the event, the secondary CPU checks the jump address slot and if non-zero, jumps to the physical address having that non-zero value to begin execution of secondary CPU initialization code 122. Alternatively, as explained above in the description of the first embodiment, WFE may be employed instead of WFE.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of initializing a secondary processor pursuant to a soft reboot of system software, said method comprising:
    storing code to be executed by the secondary processor in a region of physical memory;
    building first page tables to map the code into a first address space and second page tables to identically map the code into a second address space;
    fetching a first instruction of the code from a first location in the physical memory based on a first virtual address and active page tables, wherein the first virtual address is a virtual address in the first address space;
    executing the code beginning with the first instruction to switch the active page tables from the first page tables to the second page tables; and
    after the active page tables have been switched from the first page tables to the second page tables, (i) fetching a next instruction of the code to be executed from a second location in the physical memory using a second virtual address, which is identically mapped to a corresponding machine address, (ii) turning off a memory management unit of the secondary processor, and (iii) executing a waiting loop until a predetermined location in the physical memory changes in value, and (iv) exiting the waiting loop and executing an initialization code at a physical memory address corresponding to the changed value.

2. The method of claim 1, further comprising:
    storing the second virtual address in a register prior to executing the code; and
    reading the second virtual address from the register in response to a page fault resulting from the switch of the active page tables from the first page tables to the second page tables.

3. The method of claim 2, further comprising:
    after the active page tables have been switched from the first page tables to the second page tables and prior to fetching the next instruction, flushing a translation lookaside buffer of the memory management unit of the secondary processor.

4. The method of claim 2, wherein the first virtual address and the second virtual address map to the same machine address.

5. The method of claim 1, further comprising:
    adding entries to the second page tables to map the code into the second address space at the same virtual addresses as the first address space.

6. The method of claim 5, further comprising:
    after the active page tables have been switched from the first page tables to the second page tables and prior to fetching the next instruction, determining a next virtual address in the second address space corresponding to a next instruction of the code to be executed and computing the second virtual address by adding an offset to the next virtual address,
    wherein the offset is a difference between two starting virtual addresses in the second address space to which the code is mapped.

7. The method of claim 6, wherein the first virtual address and the second virtual address map to different machine addresses.

8. The method of claim 1, further comprising:
while executing the waiting loop, waiting for an event issued by a primary processor.

9. A non-transitory computer readable medium comprising instructions to be executed in a secondary processor pursuant to a soft reboot of system software, wherein the instructions, when executed in the secondary processor, cause the secondary processor to perform a method comprising:
storing code to be executed by the secondary processor in a region of physical memory;
building first page tables to map the code into a first address space and second page tables to identically map the code into a second address space;
fetching a first instruction of the code from a first location in the physical memory based on a first virtual address and active page tables, wherein the first virtual address is a virtual address in the first address space;
executing the code beginning with the first instruction to switch the active page tables from the first page tables to the second page tables; and
after the active page tables have been switched from the first page tables to the second page tables, (i) fetching a next instruction of the code to be executed from a second location in the physical memory using a second virtual address, which is identically mapped to a corresponding machine address, (ii) turning off a memory management unit of the secondary processor, and (iii) executing a waiting loop until a predetermined location in the physical memory changes in value, and (iv) exiting the waiting loop and executing an initialization code at a physical memory address corresponding to the changed value.

10. The non-transitory computer readable medium of claim 9, wherein the method further comprises:
storing the second virtual address in a register prior to executing the code; and
reading the second virtual address from the register in response to a page fault resulting from the switch of the active page tables from the first page tables to the second page tables.

11. The non-transitory computer readable medium of claim 10, wherein the method further comprises:
after the active page tables have been switched from the first page tables to the second page tables and prior to fetching the next instruction, flushing a translation lookaside buffer of the memory management unit of the secondary processor.

12. The non-transitory computer readable medium of claim 11, wherein the first virtual address and the second virtual address map to the same machine address.

13. The non-transitory computer readable medium of claim 9, wherein the method further comprises:
adding entries to the second page tables to map the code into the second address space at the same virtual addresses as the first address space.

14. The non-transitory computer readable medium of claim 13, wherein the method further comprises:
after the active page tables have been switched from the first page tables to the second page tables and prior to fetching the next instruction, determining a next virtual address in the second address space corresponding to a next instruction of the code to be executed and computing the second virtual address by adding an offset to the next virtual address, wherein the offset is a difference between two starting virtual addresses in the second address space to which the code is mapped.

15. The non-transitory computer readable medium of claim 14, wherein the first virtual address and the second virtual address map to different machine addresses.

16. The non-transitory computer readable medium of claim 9, wherein the method further comprises:
while executing the waiting loop, waiting for an event issued by a primary processor.

17. A computer system comprising:
a primary processor running system software; and
one or more secondary processors,
wherein, when the primary processor initiates a soft reboot of the system software, each of the secondary processors performs the steps of:
storing code to be executed by the secondary processor in a region of physical memory;
building first page tables to map the code into a first address space and second page tables to identically map the code into a second address space;
fetching a first instruction of the code from a first location in the physical memory based on a first virtual address and active page tables, wherein the first virtual address is a virtual address in the first address space;
executing the code beginning with the first instruction to switch the active page tables from the first page tables to the second page tables; and
after the active page tables have been switched from the first page tables to the second page tables, (i) fetching a next instruction of the code to be executed from a second location in the physical memory using a second virtual address, which is identically mapped to a corresponding machine address, (ii) turning off a memory management unit of the secondary processor, and (iii) executing a waiting loop until a predetermined location in the physical memory changes in value, and (iv) exiting the waiting loop and executing an initialization code at a physical memory address corresponding to the changed value.

18. The computer system of claim 17, wherein the steps further comprise:
storing the second virtual address in a register prior to executing the code; and
reading the second virtual address from the register in response to a page fault resulting from the switch of the active page tables from the first page tables to the second page tables.

19. The computer system of claim 17, wherein the steps further comprise:
adding entries to the second page tables to map the code into the second address space at the same virtual addresses as the first address space; and
after the active page tables have been switched from the first page tables to the second page tables and prior to fetching the next instruction, determining a next virtual address in the second address space corresponding to a next instruction of the code to be executed and computing the second virtual address by adding an offset to the next virtual address, wherein the offset is a difference between two starting virtual addresses in the second address space to which the code is mapped.

20. The computers system of claim 17, wherein the steps further comprise:
while executing the waiting loop, waiting for an event issued by the primary processor.

* * * * *